J. H. SAGER.
BUMPER FOR AUTOMOBILES.
APPLICATION FILED APR. 23, 1917. RENEWED MAY 26, 1920.

1,345,553.

Patented July 6, 1920.

INVENTOR
James H Sager
by Davis & Timmons
his attorneys

UNITED STATES PATENT OFFICE.

JAMES H. SAGER, OF ROCHESTER, NEW YORK, ASSIGNOR TO J. H. SAGER COMPANY OF ROCHESTER, NEW YORK, A CORPORATION.

BUMPER FOR AUTOMOBILES.

1,345,553.   Specification of Letters Patent.   Patented July 6, 1920.

Application filed April 23, 1917, Serial No. 163,997. Renewed May 26, 1920. Serial No. 384,506.

*To all whom it may concern:*

Be it known that I, JAMES H. SAGER, a citizen of the United States, and resident of Rochester, in the county of Monroe and State of New York, have invented certain new and useful Improvements in Bumpers for Automobiles, of which the following is a specification.

The present invention relates to bumpers for automobiles, and an object thereof is to provide a connection between the bumper supporting arms and the vehicle, which will permit the standardizing of automobile bumpers.

To this and other ends, the invention consists of certain parts and combinations of parts all of which will be hereinafter described, the novel features being pointed out in the appended claims.

In the drawings:—

At the present time automobiles are constructed without any consideration being given to the point or place of attachment of the bumpers. This has made it necessary for the bumper manufacturers to design different types of bumpers for different types of cars. Attempts have been made to meet this situation by providing adjustments in the bumper supporting arms of various forms and descriptions in order to adapt the bumpers to a number of types of automobiles. Although the aim has been to secure a universal type of bumper, experience has shown that this is impossible through adjustable features in the bumper. Each year the automobile manufacturers make changes which require the bumper manufacturers to make the changes in one or more of their bumper supporting arms. This absence of coöperation between the manufacturers of automobiles and the manufacturers of the bumpers has added materially to the cost of the bumpers and to the selling price thereof.

According to this invention, provision has been made whereby, notwithstanding the yearly changes in the automobile itself, the points of the attachment of the bumpers will not vary. Each automobile manufacturer will permanently attach to convenient points on the automobile brackets which will have provision for attachment of the bumper supporting arms thereto, and which will be positioned a definite distance from the ground and a definite position with reference to the foremost portions of the treads of the front wheels of the vehicle. If all manufacturers of automobiles adopt this standard position for these brackets, as well as a standard connection on the bracket, then it will be possible for bumper manufacturers to form on their bumper supporting arms a standard connection for coöperating with such brackets and to build the bumper supporting arms of a standard length. It is well known that at the present time the automobile as a whole has come to a process of standardizing, and this invention permits the standardizing of parts which have heretofore been thought to be impossible of correction, thus bringing coöperation between the manufacturers of the automobiles and the manufacturers of bumpers, and reducing the expense of manufacturing the bumpers without materially adding to the cost of manufacturing the automobile.

Figure 1:
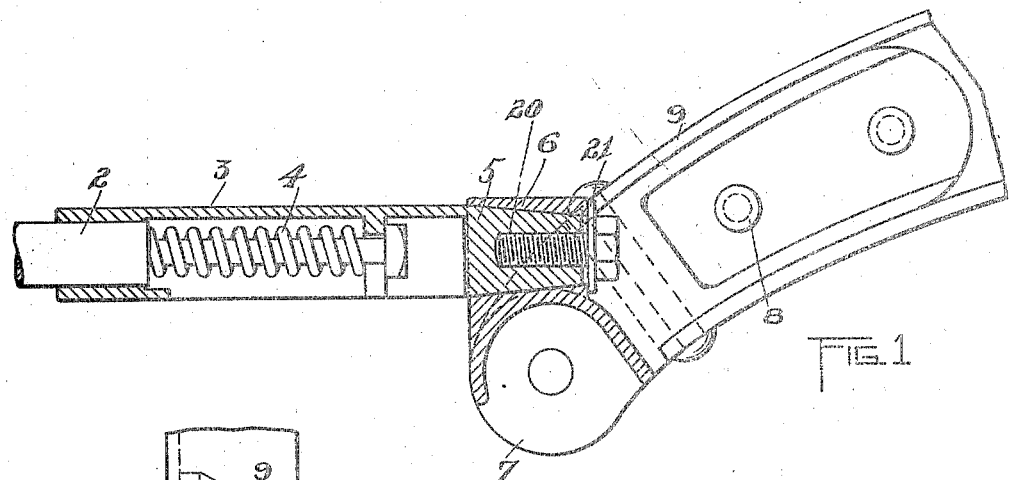
Figure 1 is a view, partially in section, of the forward end of a vehicle frame with one of the bumper supporting arms secured thereto.
Figure 2:
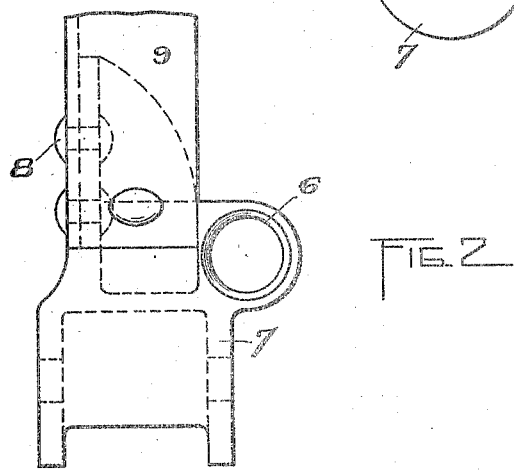
Fig. 2 is a detail view of the forward end of the vehicle frame shown in Fig. 1.
Figure 3:
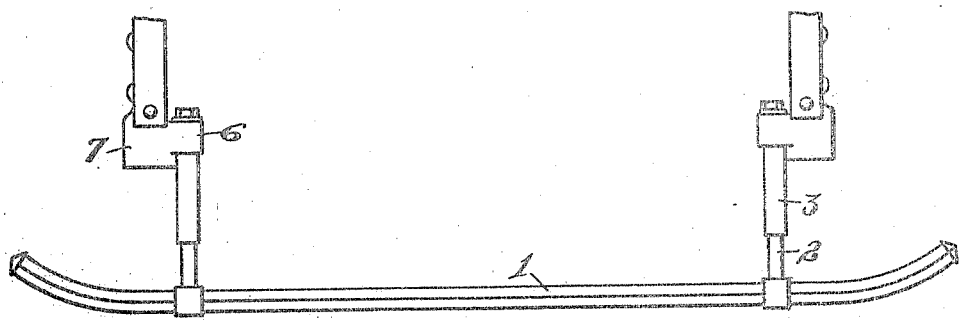
Fig. 3 is a plan view of a bumper showing the connection of the latter to the side or frame bars of an automobile, the connection being the same as that illustrated in Figs. 1 and 2.

In the embodiment of the invention shown in Figs. 1, 2, and 3, 1 indicates the bumper bar which is supported near opposite ends by two supporting arms. Each of these supporting arms, in this instance, embodies an outer member 2 and an inner member 3, the outer member being guided in the inner member, and a coiled spring 4 being interposed between the two members to permit the yielding of the bumper bar 1 on impact to absorb the shock of such impact. While in its embodiment the resilient or yielding portion of the bumper is provided in the bumper supporting arms, it is apparent that the invention is not limited to this arrangement, but that the yielding or resilient portion may be provided in any portion of the bumper in advance of the connection of the bumper supporting arms with the vehicle frame.

The connection between each bumper supporting arm and the vehicle frame embodies a portion 5 on each arm, said portion preferably being in the form of a tapered inner end which is detachably yet rigidly fitted within a tapered socket 6 which, in the embodiment shown in Figs. 1, 2 and 3, is formed integrally with the bracket 7 on the inner side of the latter, this bracket being in the form of a casting having an inner portion riveted at 8 in the end of the channeled frame bar 9 of the vehicle and an outer portion projecting beyond the channel bar for the purpose of attaching with the usual vehicle spring. The tapered end 5 may be held in the tapered socket by a bolt 20 passed through a washer 21 abutting the inner end of the socket.

From the foregoing it will be seen that a bracket construction is provided, which is permanently attached to the frame of the vehicle. Two sockets are provided whose axes are parallel and preferably horizontally arranged, those in some embodiments being above the projecting ends of the brackets to which the usual vehicle springs are secured.

The invention is also not limited to the use of these brackets on front bumpers alone, but the brackets may be positioned at the rear of the vehicle for the attachment of rear bumpers. The bumper supporting arms may thus have a standard termination at their inner ends to detachably yet rigidly connect with the socketed brackets. By this means all clips which are liable to work loose may be eliminated, and also all adjustments to permit the horizontal positioning of the bumper arms may be dispensed with, thus reducing the cost of manufacture of the bumper. The socketed brackets will be arranged in a definite position with reference to the treads of the forward wheels by the designers of the different automobiles, and the manufacturers of the bumpers can then construct the supporting arms of a standard length so that the bumper bars will lie at the proper position with reference to the treads of the wheels.

What I claim as my invention and desire to secure by Letters Patent is:—

1. In combination with a vehicle frame, two brackets each secured to such frame and each having a socket, the axes of the two sockets being parallel, a bumper bar and two bumper supporting arms each having an inner member rigidly and detachably secured in one of the sockets, an outer member guided on the inner member and connected to the bumper bar, and springs interposed between the inner and the outer members of the bumper supporting arms.

2. In combination with a bumper bar, and two supporting arms therefor, two brackets permanently secured to the vehicle frame and each provided with a socket in which the inner end of a bumper supporting arm is rigidly and detachably secured, the bumper being provided with a resilient portion permitting a yielding action beyond those portions of the bumper which directly connect with the socketed brackets.

3. In combination with a channeled frame bar of a vehicle, a bracket secured to one end of the bar and having a socket formed therein, and a bumper supporting arm rigidly and detachably secured in the socket.

4. In combination with a channeled frame bar of a vehicle, a bracket secured to one end of the bar to project therefrom and having a socket formed therein to one side of the frame bar, and a bumper supporting arm rigidly and detachably secured in the socket.

5. In combination with a pair of frame bars of a vehicle, brackets each permanently secured to one of the frame bars and each having a tapered socket, the larger end of which is disposed outwardly with reference to its frame bar and the two sockets having their longitudinal axes parallel and horizontally arranged.

6. In combination with a vehicle frame, two brackets permanently secured to such frame and each having a socket, the axes of the two sockets being horizontal and parallel, a bumper bar, and two bumper supporting arms each having an inner end fitted in a socket, and means for rigidly and detachably securing said ends in the sockets.

JAMES H. SAGER.